(12) United States Patent
Huang et al.

(10) Patent No.: US 10,191,892 B2
(45) Date of Patent: Jan. 29, 2019

(54) METHOD AND APPARATUS FOR ESTABLISHING SENTENCE EDITING MODEL, SENTENCE EDITING METHOD AND APPARATUS

(71) Applicant: BAIDU ONLINE NETWORK TECHNOLOGY (BEIJING) CO., LTD., Beijing (CN)

(72) Inventors: Jizhou Huang, Beijing (CN); Shiqi Zhao, Beijing (CN); Haifeng Wang, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 0 days.

(21) Appl. No.: 15/626,753

(22) Filed: Jun. 19, 2017

(65) Prior Publication Data

US 2018/0107636 A1    Apr. 19, 2018

(30) Foreign Application Priority Data

Apr. 29, 2016    (CN) .......................... 2016 1 0285425

(51) Int. Cl.
*G06F 17/24* (2006.01)
*G06F 17/27* (2006.01)
(Continued)

(52) U.S. Cl.
CPC ............ *G06F 17/24* (2013.01); *G06F 17/271* (2013.01); *G06F 17/2809* (2013.01); *G06F 17/30864* (2013.01)

(58) Field of Classification Search
None
See application file for complete search history.

(56) References Cited

U.S. PATENT DOCUMENTS 7,984,034 B1 *    7/2011    Shaw ................ G06F 17/30669
                                                 707/706
9,002,869 B2 *    4/2015    Riezler ............. G06F 17/30672
                                                 704/10
(Continued)

FOREIGN PATENT DOCUMENTS

CN    102982030    3/2013

OTHER PUBLICATIONS

SIPO, Office Action for CN Application No. 201610285425, dated Feb. 9, 2018.

*Primary Examiner* — Fariba Sirjani
(74) *Attorney, Agent, or Firm* — Hodgson Russ LLP

(57) ABSTRACT

The present disclosure provides a method and an apparatus for establishing a sentence editing model and a sentence editing method and apparatus. The methods includes: obtaining queries and titles of clicked search results corresponding to the queries from search logs to form query-title pairs; forming training corpuses by taking a title in each of the query-title pairs as a sentence to be edited and taking a query in the query-title pair as an edited sentence; and training a translation model and a first language model using the training corpuses to obtain a sentence editing model including the translation model and the first language model; after obtaining a sentence to be edited, inputting the sentence to be edited to a sentence editing model to obtain an editing score of each candidate edited sentence; and selecting a candidate edited sentence having an editing score satisfying a preset requirement as an edited sentence.

18 Claims, 5 Drawing Sheets

(51) Int. Cl.
*G06F 17/28* (2006.01)
*G06F 17/30* (2006.01)

(56) References Cited

U.S. PATENT DOCUMENTS

| | | | |
|---|---|---|---|
| 2010/0010895 A1* | 1/2010 | Gabrilovich | G06Q 30/02 705/14.54 |
| 2010/0125570 A1* | 5/2010 | Chapelle | G06F 17/30864 707/722 |
| 2010/0205198 A1* | 8/2010 | Mishne | G06F 17/30687 707/759 |
| 2011/0131205 A1* | 6/2011 | Iyer | G06F 17/30663 707/728 |
| 2011/0231347 A1* | 9/2011 | Xu | G06F 17/30864 706/12 |
| 2012/0096042 A1* | 4/2012 | Brockett | G06F 17/30448 707/798 |
| 2012/0226641 A1* | 9/2012 | Hu | G06F 17/30705 706/12 |
| 2013/0103493 A1* | 4/2013 | Gao | G06Q 10/10 705/14.46 |
| 2014/0358519 A1* | 12/2014 | Mirkin | G06F 17/2854 704/3 |
| 2015/0317389 A1* | 11/2015 | Hua | G06F 17/30705 706/12 |
| 2017/0323204 A1* | 11/2017 | Akbulut | G06N 5/022 |
| 2018/0032532 A1* | 2/2018 | Pendar | G06N 99/005 |
| 2018/0121429 A1* | 5/2018 | Agrawal | G06F 17/3053 |

* cited by examiner

METHOD AND APPARATUS FOR ESTABLISHING SENTENCE EDITING MODEL, SENTENCE EDITING METHOD AND APPARATUS

CROSS-REFERENCE TO RELATED APPLICATION

The present application is based upon and claims priority to Chinese Patent Application No. 201610285425.0, filed on Apr. 29, 2016, the entirety contents of which are incorporated herein by reference.

FIELD

The present disclosure relates to a natural language processing field, and more particularly to, a method and an apparatus for establishing a sentence editing model, and a sentence editing method and apparatus.

BACKGROUND

With the rapid development of the network technology, people can obtain a variety of information through network. Besides providing a large number of information to the user, service providers are required to provide information with higher quality. Different experience is provided to the user when different words or expressions are used for a same sentence.

In many scenarios, some information is automatically generated. For example, in some websites or network services, introductions of entities, such as characters, animals, places, film and television, are sentences automatically generated by capturing and extracting main information from the network. However, these automatically generated sentences are less readable in most cases, bringing poor reading experience to the use, let alone satisfying "faithfulness, expressiveness, elegant" requirements. Human cost is too high if these sentences are edited by manual participation.

SUMMARY

For this, the present disclosure provides a method and an apparatus for establishing a sentence editing model and a sentence editing method and apparatus.

Technical solutions are as follows.

The present disclosure provides a method for establishing a sentence editing model, including: obtaining queries and titles of clicked search results corresponding to the queries from search logs to form query-title pairs; forming training corpuses by taking a title in each of the query-title pairs as a sentence to be edited and taking a query in the query-title pair as an edited sentence; and training a translation model and a first language model using the training corpuses, to obtain the sentence editing model comprising the translation model and the first language model.

The present disclosure also provides a sentence editing method, including: obtaining a sentence to be edited; inputting the sentence to be edited to a sentence editing model to obtain an editing score of each candidate edited sentence; and selecting a candidate edited sentence having an editing score satisfying a preset requirement as an edited sentence, wherein the sentence editing model is established using the above method for establishing a sentence editing model.

The present disclosure also provides an apparatus for establishing a sentence editing model, including: an obtaining unit, configured to obtain queries and titles of clicked search results corresponding to the queries from search logs to form query-title pairs; and to form training corpuses by taking a title in each of the query-title pairs as a sentence to be edited and taking a query in the query-title pair as an edited sentence; and a training unit, configured to train a translation model and a first language model using the training corpuses, to obtain the sentence editing model comprising the translation model and the first language model.

The present disclosure also provides a sentence editing apparatus, including: an input obtaining unit, configured to obtain a sentence to be edited; a score obtaining unit, configured to input the sentence to be edited to a sentence editing model to obtain an editing score of each candidate edited sentence; and a sentence output unit, configured to select a candidate edited sentence having an editing score satisfying a preset requirement as an edited sentence; the sentence editing model is established using the above apparatus for establishing a sentence editing model.

DETAILED DESCRIPTION

The present disclosure will be described in detail with reference to drawings and specific embodiments, so as to make objectives, technical solutions and advantages of the present disclosure clearer.

Terms used in the embodiments of the present disclosure are only for the purpose of describing specific embodiments, but should not be construed to limit the present disclosure. As used in the description of the present disclosure and the appended claims, "a" and "the" in singular forms mean including plural forms, unless clearly indicated in the context otherwise.

It should also be understood that, as used herein, the term "and/or" represents an association relationship of associated items and contains three kinds of relationship. For example, "A and/or B" may represent the presence of A alone, the presence of A and B together, or the presence of B alone. In addition, the character "/" generally represents an "or" relationship of the associated items.

As used herein, the term "if" may be construed to mean "when" or "upon" or "in response to determining" or "in accordance with a determination" or "in response to detecting," depending on the context. Similarly, the phrase "if it is determined" or "if it is detected [that a stated condition precedent is true]" may be construed to mean "upon determining" or "in response to determining" or "upon detecting" or "in response to detecting" that the stated condition precedent is true, depending on the context.

Figure 1:
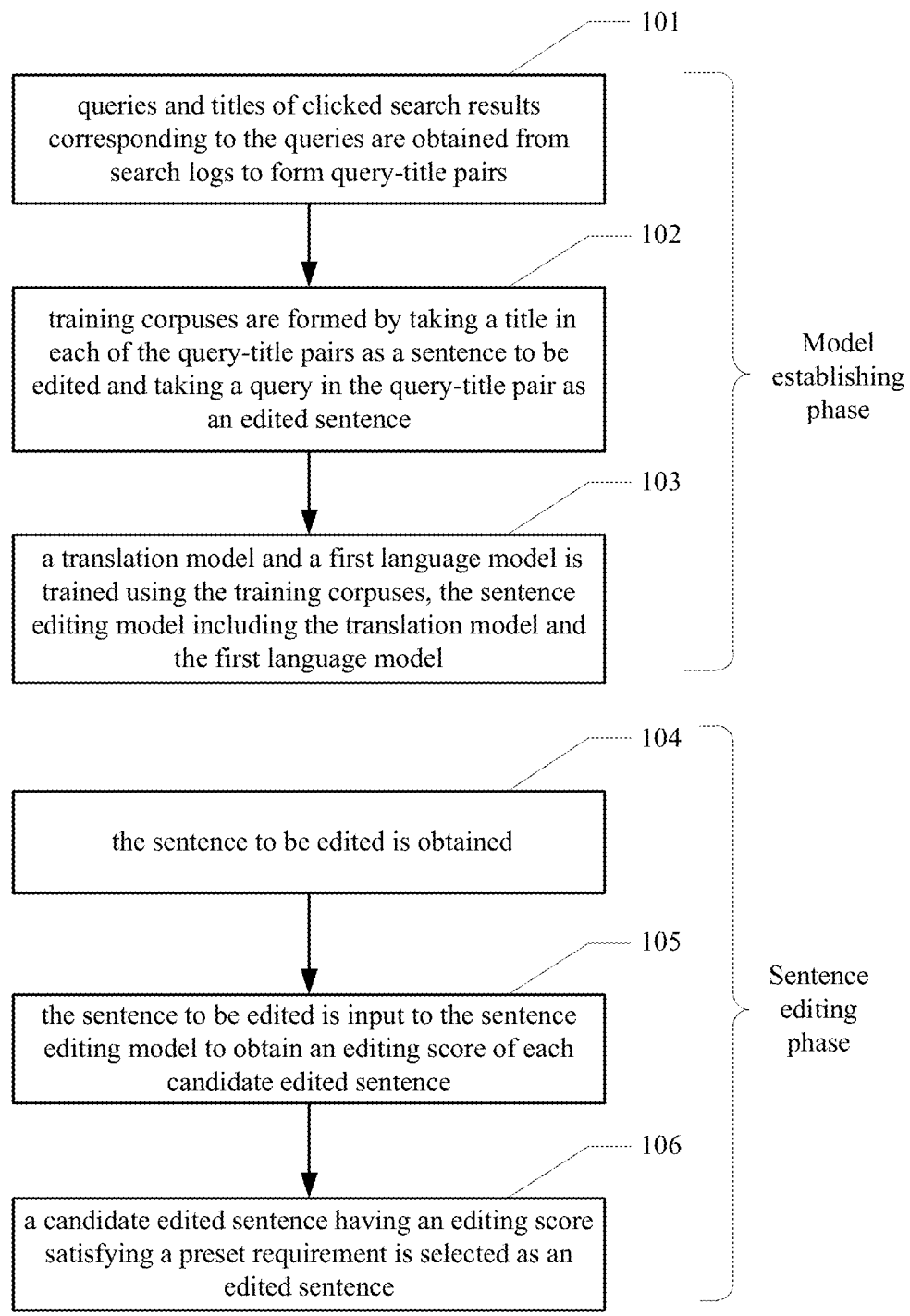
FIG. 1 is a flow chart of a method according to embodiments of the present disclosure.

FIG. 1 is a flow chart of a method according to embodiments of the present disclosure. There are mainly two phases in this embodiment, in which, a first phase is a model establishing phase, and a second phase is a sentence editing phase. The present disclosure realizes automatic editing of sentences by establishing a sentence editing model. As shown in FIG. 1, the method may mainly include followings.

In block S101, queries and titles of clicked search results corresponding to the queries are obtained from search logs to form query-title pairs.

Massive monolingual parallel corpuses are required to train the sentence editing model. The monolingual parallel corpuses refer to corpuses consisting of two parallel corresponding sentences which express a same meaning and may use different vocabularies or expression ways. Parallel corpuses may include bilingual/multilingual parallel corpuses and the monolingual parallel corpuses. The bilingual/multilingual parallel corpuses are mostly used for translation of different languages. Since the present disclosure deals with sentence editing in a same language, the monolingual parallel corpuses are used in the present disclosure, i.e., two sentences in a corpus are in the same language.

After observation, study and demonstration, it is found that, when a user searches with a search engine, it often uses a more compact and clearer query which is manually entered by the user, such that the query is closer to actual expression of human with high readability. After the user obtains a search result page corresponding to the query, a clicked search result is usually very relevant to the query, and meaning of a title of the clicked search result may be considered very close to the query but less concise than the query. Therefore, the query can be considered as a concise description of the clicked search result. i.e., a more readable description of the clicked search result. Therefore, corpuses formed by the query-title pairs are well monolingual parallel corpuses. For the above reasons, query-title pairs obtained from clicked data of the search engine can be used to generate the training corpuses in embodiments of the present disclosure.

Figure 2:
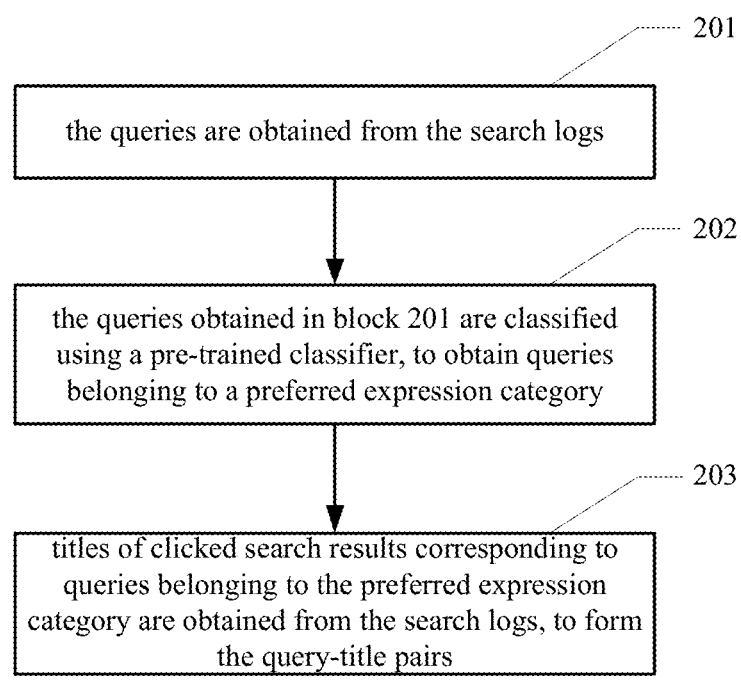
FIG. 2 is a flow chart of a method for obtaining training corpuses according to an embodiment of the present disclosure.

An implementation of this block is provided in an embodiment of the present disclosure. As shown in FIG. 2, obtaining the query-title pairs may include followings.

In block 201, the queries are obtained from the search logs.

In block 202, the queries obtained in block 201 are classified using a pre-trained classifier, to obtain queries belonging to a preferred expression category.

Filter may be performed on the queries obtained from the search logs, since the number of the queries obtained from the search logs is large and quality of the queries obtained from the search logs varies greatly. A classifier can be used in the filter. That is to say, a classifier is pre-trained, which can divide queries into at least two categories: a preferred expression category and a non-preferred expression category. The queries obtained from the search logs are input to the classifier, and then queries belonging to the preferred expression category are obtained.

For the training of the classifier, some preferred expression sentences may be pre-selected as training corpuses for training. When the training corpuses are selected, preferred expression sentences corresponding to entries may be obtained from encyclopedia webpages, or a preferred expression sentence template may be used to obtain preferred expression sentences matching the preferred expression sentence template from webpages. An example of the preferred expression sentence template may be "[entity] is/are/mean [preferred expression sentence]".

For example, a sentence is "Andy Liu is an entertainer developing in multi-dimensions such as film, television and singing".

The sentence just matches the above preferred expression sentence template, then "an entertainer developing in multi-dimensions such as film, television and singing" can be extracted as a preferred expression sentence.

In block 203, titles of clicked search results corresponding to queries belonging to the preferred expression category are obtained from the search logs, to form the query-title pairs.

In this block, a query and a title of a clicked search result corresponding to the query can directly form a query-title pair. The more the training samples used in model training is, the more accurate the obtained model is. Therefore, extension can be performed in this block so as to improve accuracy of the sentence editing model. After the title of a clicked search result corresponding to each query belonging to the preferred expression category is obtained from the search logs, the obtained title may be split into one or more sub-titles, for example split based on punctuations. And then a query-title pair is formed according to each of the one or more sub titles and the corresponding query.

Continue to refer to FIG. 1.

In block 102, training corpuses are formed by taking a title in each of the query-title pairs as a sentence to be edited and taking a query in the query-title pair as an edited sentence.

Before this block is executed, the obtained query-title pairs can be further filtered, in which, filter principles used may include but not limit to followings.

In a first kind of filter, when there is no same word between a title and a query of a query-title pair, the query-title is filtered out.

In a second kind of filter, when a query and a title in a query-title pair are completely same, the query-title pair is filtered out.

In a third kind of filter, when a length of a query in a query-title pair does not satisfy a preset length requirement, the query-title pair is filtered out. A purpose of this kind of filter is to limit a length of an edited sentence within a certain length range. For example, when a length of a query is larger than 10 characters or less than 6 characters, a query-title pair including the query is filtered out.

In a fourth kind of filter, when a ratio of a shorter one of a length of a query and a length of a title in a query-title pair to a longer one is less than a preset ratio threshold (for example, less than ⅔), the query-title pair is filtered out.

In block 103, a translation model and a first language model is trained using the training corpuses, to obtain the sentence editing model including the translation model and the first language model.

The sentence editing model established according to the present disclosure may include a translation model and a first language model, and may further include a length model and an attraction model. The translation model is configured to synonymously rewrite a sentence to be edited and to improve accuracy of sentences. The first language model is configured to improve fluency of sentences. The length model is configured to improve concision degree of sentences. The attraction model is configured to make sentences more lively and interesting, i.e. more attractive to the user. The attraction model may include two models: a second language model and a syntactic structure model. Training corpuses used for training the above two language models (the first language model and the second language model) are different, and thus effect of the above two language models are different. Above models included in the sentence editing model are described in detain in the following.

1) The Translation Model

There are many types of translation model. A statistical machine translation (SMT for short) model is used in embodiments of the present disclosure. The SMT model has better performance among current translation models in non-limited field. Basic idea of statistical machine translation is to establish a SMT model by performing statistic analysis on a mass of parallel corpuses, and then use this SMT model for translation.

The present disclosure relates to monolingual translation, i.e., input language is same language as target language. In that way, the parallel corpuses used in embodiments of the present disclosure are monolingual parallel corpuses. In embodiments of the present disclosure, the translation model can be trained using sentences to be edited and edited sentences corresponding to the sentences to be edited (i.e. title-query pairs) in the training corpuses. The translation model obtained may include a translation score of an edited sentence corresponding to each sentence to be edited.

Operating principle of the translation model is as follows. An input sentence s (corresponding to a sentence to be edited) is segmented into a sequence $s_1^{-l}$ of segments, and then, each of the segments are translated, a sequence $e_1^{-l}$ is formed by translated segments. $(s_1^{-l}, e_1^{-l})$ is considered as one translation unit, and a translation likelihood value of the translation unit is calculated using a function $\varphi_{tm}(\bar{s}_1, \bar{e}_1)$. And then, a translation score $p_{tm}(s_1^{-l}, e_1^{-l})$ between s and e is obtained according to following formula (1).

$$p_{tm}(\bar{s}_1^{-l}, \bar{e}_1^{-l}) = \prod_{i=1}^{l} \phi_{tm}(\bar{s}_i, \bar{e}_i)^{\lambda_{tm}} \quad (1)$$

where, $\bar{s}_i$ is $i^{th}$ segment $s_1^{-l}$, $\bar{e}_i$ is a translation segment corresponding to $\bar{s}_i$ in sequence $e_1^{-l}$, 1 is a number of segments obtained by segmenting sentence s, $\lambda_{tm}$ is a weight parameter of the translation model.

2) The First Language Model

The first language model describes a probability distribution of a given word sequence in a language, and is used for calculating a probability that a given sentence segment becomes a fluent and smooth sentence. The probability is usually embodied as a match score of an n-gram phrase, where n is a preset positive integer. An n-gram phrase refers to a phrase in which n words are grouped in sequence. In embodiments of the present disclosure, the first language model can be trained using edited sentences in the training corpuses. In an embodiment of the present disclosure, n is 3, i.e., a 3-gram language model is established. A match score $p_{lm}(e)$ may be obtained by scoring the edited sentence e using following formula (2).

$$p_{lm}(e) = \prod_{j=1}^{J} p(e_j | e_{j-2} e_{j-1})^{\lambda_{lm}} \quad (2)$$

where, J is a number of words in e, $e_j$ is $i^{th}$ word in e, $\lambda_{lm}$ is a weight parameter of the first language model.

3) The Length Model

The length model is set to make an edited sentence within a certain length range as much as possible, so as to make the edited sentence as concise as possible. The length model includes length scores of sentences with different lengths. In embodiments of the present disclosure, the length model may be realized using length penalty mechanism. A length score may be obtained by scoring the edited sentence e based on the length model using following formula (3).

$$p_{lf}(e) = \begin{cases} N, & N \leq L_{th} \\ \dfrac{1}{N - L_{th}}, & N > L_{th} \end{cases} \quad (3)$$

where, N is a number of characters in e, $L_{th}$ is a preset length threshold. For example, $L_{th}$ may be 10, such that the edited sentence may be limited within 10 Chinese characters as much as possible.

4) The Second Language Model

Mechanism of the second language model is same as that of the first language model, both of which are to reflect a match score of a sentence. That is to say, the second language model includes match scores of m-gram phrases, where m is a preset positive integer. Differences are that purposes of the two language models are different, and training corpuses used for training the two language models are different. The second language model can also calculate a probability that a given sentence segment becomes a fluent and smooth sentence, but more emphasis on calculating a probability that a given sentence segment becomes an attractive sentence. For the above translation model, what realized is "faithfulness" of editing, i.e., accuracy. For the first language model, what realized is "expressiveness" of editing, i.e., fluency. For the second language model, what realized is "elegant" of editing, i.e., more elegant and more beautiful expression, which can attract the user to read. Therefore, training corpuses used may be sentences expressed more attractive when the second language model is trained. After observation, study and demonstration, it is found that, titles of news are usually as concise and interesting as possible when news editors edit the news titles, so as to attract users to click and read. Therefore, in embodiments of the present disclosure, news titles may be used as training corpuses for training the second language model. The second language model is similar to the first language model, and in an embodiment of the present disclosure, n is 3, i.e., a 3-gram language model is established. A match score $p_{hl}(e)$ may be obtained by scoring the edited sentence e using following formula (4).

$$p_{hl}(e) = \prod_{l=1}^{L} p(e_l | e_{l-2} e_{l-1})^{\lambda_{hl}} \quad (4)$$

where, L is a number of words in e, $e_l$ is $l^{th}$ word in e, $\lambda_{hl}$ is a weight parameter of the second language model.

5) The Syntactic Structure Model

The syntactic structure model is also to realize "elegant" of editing, so as to attract users to read. With the syntactic structure model, a sentence can be edited to a syntactic structure that is more coincident with human expression. When the syntactic structure model is trained, artificially edited sentences can be taken as training samples. For example, some sentences to be edited can be provided to editors through a manner of crowdsourcing. A plurality of editors edits a same sentence respectively, thus obtaining a plurality of edited sentences, and each of the plurality of edited sentences is scored by each of the plurality of editors. Sentences whose scores satisfy a requirement are considered as the training samples.

The syntactic structure model finally obtained by training is configured to calculate a similarity score in syntactic structure between an artificially edited sentence and each edited sentence. In the syntactic structure model, a similarity score in syntactic structure between an edited sentence e and an artificially edited sentence can be calculated with following formula (5).

$$p_{ss}(e) = \max(K(T_e, T_{t_i})) \quad (5)$$

where, $T_x$ is a dependency parsing tree of sentence x, $t_i$ is a artificially annotated recommendation reason, $K(\bullet,\bullet)$ is a kernel function of two dependency parsing trees therein, reflecting a similarity in syntactic structure between sentences.

A sentence editing model finally obtained may be a model obtained by weighting and combining models included therein. When a logarithmic linear relation is used for weighting and combining, a following sentence editing model can be obtained.

$$P(e|s) = \lambda_{tm} \Sigma_{i=1}^{I} \log \lambda_{tm}(\bar{s}_i, \bar{e}_i) + \lambda_{lm} \Sigma_{j=1}^{J} \log p(e_j|e_{j-2}e_{j-1}) + \lambda_{lf} \log p_{lf}(e) + \lambda_{hl} \Sigma_{l=1}^{L} \log p(e_l|e_{l-2}e_{l-1}) + \lambda_{ss} \log p_{ss}(e) \quad (6)$$

where, P(e|s) is an editing score that e is considered as an edited sentence of sentence s, $\lambda_{lf}$ is a weight parameter of the length model, and $\lambda_{ss}$ is a weight parameter of the syntactic structure model.

Weight parameter of each of the above models, such as $\lambda_{tm}$, $\lambda_{lm}$, $\lambda_{lf}$, $\lambda_{hl}$ and $\lambda_{ss}$ can be a preset value and can be adjusted flexibly. The preset value may be an empirical value, an experimental value or the like. When a weight parameter is determined, a minimum error rate training (MERT for short) can be used.

Above are processes of establishing models, which are offline processes pre-executed, i.e., the sentence editing model is pre-established. When there is a sentence to be edited, following actions can be performed on the sentence to be edited.

In block 104, the sentence to be edited is obtained.

In block 105, the sentence to be edited is input to the sentence editing model to obtain an editing score of each candidate edited sentence.

After the sentence to be edited is obtained, candidate edited sentences and the editing score of each candidate edited sentence can be obtained with the sentence editing model. It can be seen from above formula (6) that, the editing score of each candidate edited sentence can be co-determined by the translation model, the first language model, the length model, the second language mode, and the syntactic structure model, an a comprehensive score is obtained by comprehensively considering factors such as accuracy, fluency, length and attractiveness of each candidate edited sentence.

In block 106, a candidate edited sentence having an editing score satisfying a preset requirement is selected as an edited sentence.

When selecting the edited sentence, a sentence whose editing score is larger than a preset threshold can be selected, or sentences whose editing scores are ranked at top N can be selected, in which N is a preset positive integer. For example, a candidate edited sentence with a highest editing score is selected as the edited sentence, such that the edited sentence satisfies "faithfulness, expressiveness, elegant" requirements as much as possible.

Above is detail description of methods provided by the present disclosure, and apparatus provided by the present disclosure will be described in detail with reference to embodiments.

Figure 3:
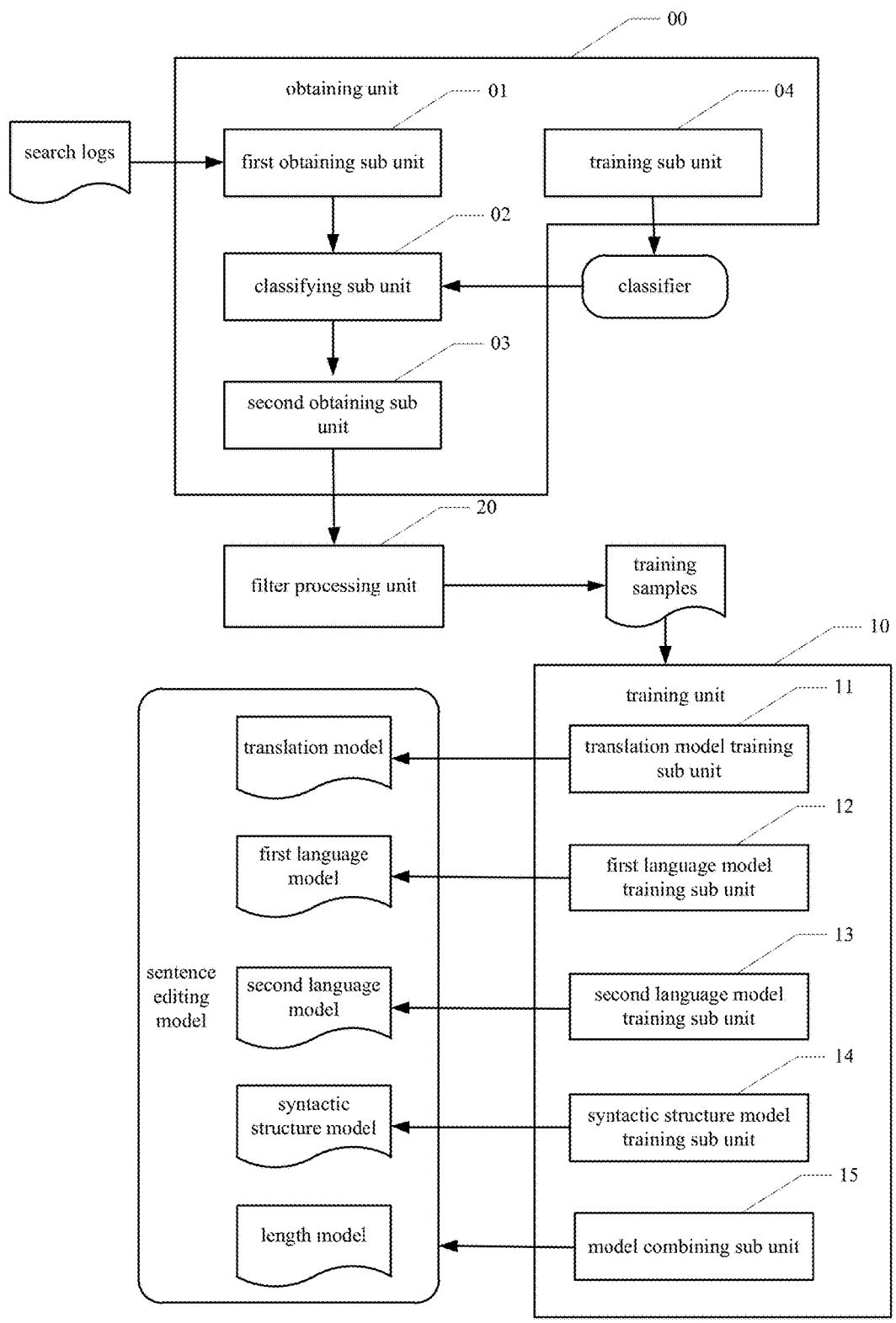
FIG. 3 is a block diagram of an apparatus for establishing a sentence editing model according to an embodiment of the present disclosure.

FIG. 3 is a block diagram of an apparatus for establishing a sentence editing model according to an embodiment of the present disclosure. As shown in FIG. 3, the apparatus may include an obtaining unit 00 and a training unit 10, and may further include a filter processing unit 20. Composition and main functions of each unit are as follows.

The obtaining unit 00 is configured to obtain queries and titles of clicked search results corresponding to the queries from search logs to form query-title pairs, and to form training corpuses by taking a title in each of the query-title pairs as a sentence to be edited and taking a query in the query-title pair as an edited sentence.

The training unit 10 is configured to train a translation model and a first language model using the training corpuses, to obtain a sentence editing model including the translation model and the first language model. The sentence editing model may further include at least one of a length model, a second language model and a syntactic structure model.

Massive monolingual parallel corpuses are required to train the sentence editing model. The obtaining unit 00 may include a first obtaining sub unit 01, a classifying sub unit 02, and a second obtaining sub unit 03, and may further include a training sub unit 04.

The first obtaining sub unit 01 is configured to obtain the queries from the search logs.

The classifying sub unit 02 is configured to classify the queries using a pre-trained classifier, to obtain queries belonging to a preferred expression category. A reason for classifying the queries is that quality of the queries obtained from the search logs varies greatly. Filter may be performed on the queries obtained from the search logs so as to find preferred expressed queries.

The second obtaining sub unit 03 is configured to obtain titles of clicked search results corresponding to queries belonging to the preferred expression category from the search logs, to form the query-title pairs.

The training sub unit 04 is configured to obtain preferred expression sentences corresponding to entries from encyclopedia webpages, or to obtain preferred expression sentences matching a preferred expression sentence template from webpages using the preferred expression sentence template. An example of the preferred expression sentence template may be "[entity] is/are/mean [preferred expression sentence]". The training sub unit 04 is further configured to train the classifier using obtained preferred expression sentences as positive samples.

The more the training samples used in model training, the more accurate the obtained model is. Therefore, extension can be performed through the second obtaining sub unit 03 so as to improve accuracy of the sentence editing model. In detail, the second obtaining sub unit 03 is configured to obtain the titles of clicked search results corresponding to queries belonging to the preferred expression category from the search logs, to split each obtained title into one or more sub-titles, and to form a query-title pair according to the query and a corresponding sub-title.

In addition, the obtained query-title pairs can be further filtered, and query-title pairs filtered by the filter processing unit 20 are taken as training samples, in which, filter principles used may include but not limit to the following.

In a first kind of filter, when there is no same word between a title and a corresponding query of a query-title pair, the query-title is filtered out.

In a second kind of filter, when a query and a title in a query-title pair are completely same, the query-title pair is filtered out.

In a third kind of filter, when a length of a query in a query-title pair does not satisfy a preset length requirement, the query-title pair is filtered out. A purpose of this kind of filter is to limit a length of an edited sentence within a certain length range. For example, when a length of a query is larger than 10 characters or less than 6 characters, a query-title pair including the query is filtered out.

In a fourth kind of filter, when a ratio of a shorter one of a length of a query and a length of a title in a query-title pair is less than a preset ratio threshold (for example, less than ⅔), the query-title pair is filtered out.

The above training unit 10 may include a translation model training sub unit 11 and a first language model training sub unit 12, and may further include at least one of a second language model training sub unit 13, a syntactic structure model training sub unit 14 and a model combining sub unit 15.

The translation model training sub unit 11 is configured to train the translation model using sentences to be edited and edited sentences corresponding to the sentences to be edited in the training corpuses. The translation model is configured to synonymously rewrite a sentence to be edited, and is configured to calculate a translation score of an edited sentence corresponding to each sentence to be edited. The translation score can be obtained according to the formula (1) in above method embodiments.

The first language model training sub unit 12 is configured to train the first language model using edited sentences in the training corpuses. The first language model is configured to calculate a match score of an n-gram phrase, where n is a preset positive integer. That is to say, the first language model is used for calculating a probability that a given sentence segment becomes a fluent and smooth sentence. The match score can be obtained according to the formula (2) in above method embodiments.

The sentence editing model may further include a length model. The length model is configured to calculate length scores of sentences with different lengths. The length score can be obtained according to the formula (3) in above method embodiments.

The second language model training sub unit 13 is configured to train the second language model by taking news titles as training corpuses. The second language model is configured to calculate a match score of an m-gram phrase, where m is a preset positive integer. The second language model can also calculate a probability that a given sentence segment becomes a fluent and smooth sentence, but more emphasis on calculating a probability that a given sentence segment becomes an attractive sentence. The match score can be obtained according to the formula (4) in above method embodiments.

The syntactic structure model training sub unit 14 is configured to train the syntactic structure model by taking artificially edited sentences as training samples. The syntactic structure model is configured to calculate a similarity score in syntactic structure between an artificially edited sentence and each edited sentence. The similarity score can be obtained according to the formula (5) in above method embodiments.

The model combining sub unit 15 is configured to weight and combine models comprised in the sentence editing model, to obtain the sentence editing model. When a logarithmic linear relation is used for weighting and combining, a recommendation reason generating model shown as formula (6) can be obtained.

Figure 4:
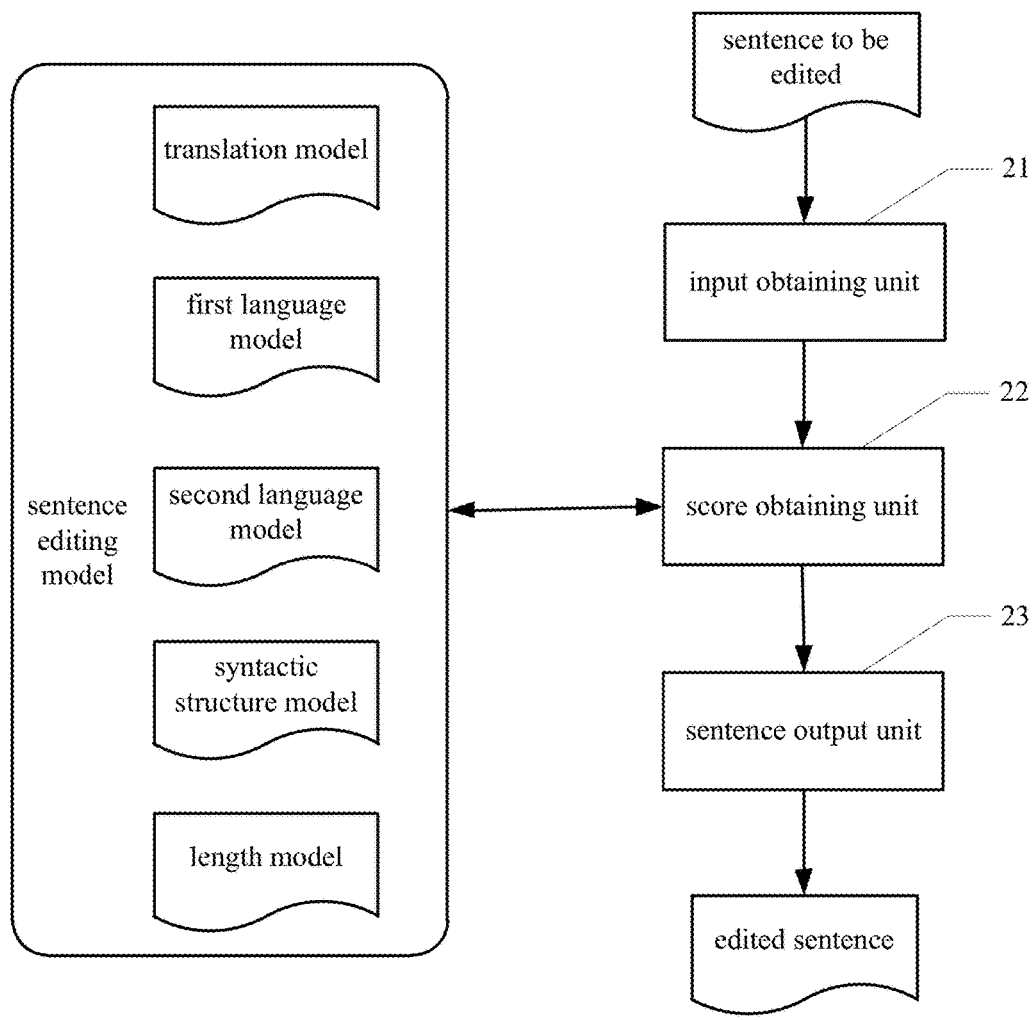
FIG. 4 is a block diagram of a sentence editing apparatus according to another embodiment of the present disclosure.

FIG. 4 is a block diagram of a sentence editing apparatus according to another embodiment of the present disclosure. The sentence editing apparatus realizes automatic editing of a sentence based on above sentence editing model. As shown in FIG. 4, the apparatus may include an input obtaining unit 21, a score obtaining unit 22 and a sentence output unit 23. Composition and main functions of each unit are as follows.

The input obtaining unit 21 is configured to obtain a sentence to be edited.

The score obtaining unit 22 is configured to input the sentence to be edited to a sentence editing model to obtain an editing score of each candidate edited sentence.

The sentence output unit 23 configured to select a candidate edited sentence having an editing score satisfying a preset requirement as an edited sentence.

When selecting the edited sentence, a sentence whose editing score is larger than a preset threshold can be selected, or sentences whose editing scores are ranked at top N can be selected, in which N is a preset positive integer. For example, a candidate edited sentence with a highest editing score is selected as the edited sentence.

Fields and languages are not limited in the present disclosure because models and characteristics used in the present disclosure are not related to language. Various languages and entities of various types are applicable to the present disclosure. Above described methods and apparatuses provided in embodiments of the present disclosure can be applied in a plurality of application scenarios, and an example of an application scenario of the above described methods and apparatuses is given here.

Figure 5:
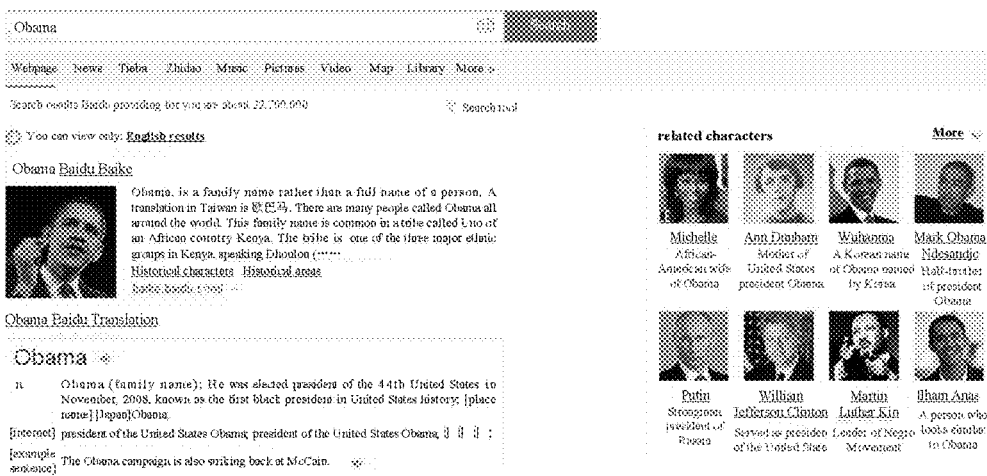
FIG. 5 is a schematic diagram of an application scene according to an embodiment of the present disclosure.

In past years, network search engine greatly enriches and improves the user experience by providing entity recommendations to the user. When the user enters a search keyword to the search engine, the search engine may provide entity recommendations related to the search keyword to the user, and may display recommended entity words next to search results. As shown in FIG. 5, when the user enters a search keyword "Obama" in the search engine, the search engine can display a series of names as recommended entity words of "Obama" on the right side (related characters section in FIG. 5) of search results, such that the use can quickly visit a recommended entity word he interests in, thus improving information searching experience of the user.

Entity recommendation has become a key technology of present web search. Although the recommended entity words are related to the search keyword entered by the user, in many cases, if the user does not have an understanding of relevant background knowledge about the recommended entity words, the user may be likely not able to understand why the entity words are recommended and may be confused, thus the user may not use the recommended entity words. It is necessary to further provide a recommendation reason for the recommended entity words to the user so as to help the user to quickly learn whether and how the recommended entity words can satisfy his interests. For example, as shown in FIG. 5, for a recommended entity word "Wuhanma", if the user does not understand it, the user does not understand why the recommended entity word "Wuhanma" is recommended. If a recommendation reason "a Korean name of "Obama" named by Korea" is displayed below "Wuhanma", a well experience may be provided to the user.

At present, for the recommendation reasons of the recommended entity words, one way is manual labeling, by which workload is too large, and human costs are high. Another way is extracting structured data from the encyclopedia pages as a recommendation reason, by which coverage ratio is too low, and many recommended entity words may not be completely covered. However, with the manners provided in embodiments of the present disclosure, a description sentence for an entity word can be obtained. With above mentioned methods and apparatuses, the description sentence for an entity word can be edited, and the edited sentence can be obtained. When the entity word is taken as a recommended entity word corresponding to the query in search result pages, the edited sentence can be taken as a recommendation reason for the recommended entity word.

With above mentioned manners for obtaining the recommended reason for the recommended entity word, following effect can be achieved. 1) The recommendation reason can accurately describe the entity word. 2) Expression of the recommendation reason is fluent. 3) The recommendation reason is concise enough to be displayed in a limited area. 4) Expression of the recommendation reason can attract the user to browse and click a corresponding recommended entity word.

For example, a description sentence s of the recommended entity word "Wuhanma" is edited to e.

s: A Korean name that Korea gives for the 44$^{th}$ president "Obama" of the United States.

e: a Korean name of "Obama" named by Korea.

It can be seen that, the latter is more concise, fluent and attractive.

It should be understood that, in the embodiments provided by the present disclosure, the apparatus and the method disclosed may be implemented via other manners. For example, the apparatus embodiment described above is exemplary, e.g., the division for the modules is only a logic function division, and there may be other division manners in practice.

The module illustrated as a separated component may be or may not be a separated one physically, the component shown as a module may be or may not be a physical unit, that is, it may be located at one place, or may be distributed in a plurality of network units. It may select a part of or all of units therein to realize the purpose of the present disclosure according to practice.

In addition, each functional unit in the present disclosure may be integrated in one progressing unit, or each functional unit exists as an independent unit, or two or more functional units may be integrated in one module. The integrated unit can be embodied in hardware, or hardware with software.

The integrated unit embodied in software can be stored in the computer readable storage medium. The software functional unit stores in one storage medium, including instructions for causing one computer apparatus (which may be a personal computer, a server, or a network apparatus) or a processor to execute a partial steps of the method according to each embodiment of the present disclosure. The storage medium described above includes various mediums which may store program codes, such as, a USB disk, a mobile hard disk, read-only memory (ROM), a random access memory (RAM), a magnetic disk, or an optical disk.

Although preferred embodiments have been shown and described above, it would be appreciated that the above embodiments cannot be construed to limit the present disclosure, and any changes, alternatives, and modifications made without departing from spirit and principles of the present disclosure should be included in the scope of the present disclosure.

What is claimed is:

1. A computer-implemented method for establishing a sentence editing model and using the sentence editing model, the computer-implemented method being implemented on a computer including one or more processors and a memory storing one or more software units, the computer-implemented method, comprising:

receiving as an input, search logs from a web search engine, the search logs including queries and titles of clicked search results corresponding to the queries that form query-title pairs, the queries corresponding to a sentence provided as an input into the web search engine;

forming monolingual training corpuses by taking a title in each of the query-title pairs as a sentence to be edited and taking a query in the query-title pair as an edited sentence;

training a translation model and a first language model using the monolingual training corpuses, to obtain the computer sentence editing model comprising the translation model and the first language model;

receiving one or more input sentences at the sentence editing model;

generating one or more output edited sentences by the sentence editing model corresponding to the one or more input sentences; and displaying the one or more output edited sentences to a user;

wherein training the translation model using the train training corpuses comprises training the translation model using sentences to be edited and edited sentences corresponding to the sentences to be edited in the monolingual training corpuses, and wherein the translation model is configured to calculate a translation score for each candidate edited sentence corresponding to each sentence to be edited.

2. The method according to claim 1, wherein receiving the search logs comprises:

obtaining the queries from the search logs;

classifying the queries using a pre-trained classifier, to obtain queries belonging to a preferred expression category; and obtaining titles of clicked search results corresponding to queries belonging to the preferred expression category from the search logs, to form the query-title pairs, wherein training of the classifier comprises:

obtaining preferred expression sentences corresponding to entries from encyclopedia webpages, or obtaining the preferred expression sentences from webpages using a preferred expression sentence template; and training the classifier using obtained preferred expression sentences as positive samples; and wherein obtaining titles of clicked search results corresponding to queries belonging to the preferred expression category from the search logs to form the query-title pairs comprises:

obtaining the titles of clicked search results corresponding to queries belonging to the preferred expression category from the search logs;

splitting each obtained title into one or more sub-titles; and forming a query-title pair according to the query and corresponding sub-title.

3. The method according to claim 1, before training the sentence editing model, further comprising performing at least one of following filter processing on the monolingual training corpuses:

when there is no same word between a query and a title of a query-title pair, filtering out the query-title pair;

when a query and a title in a query-title pair are same, filtering out the query-title pair;

when a length of a query in a query-title pair does not satisfy a preset length requirement, filtering out the query-title pair; and when a ratio of a shorter one of a length of a query and a length of a title in a title in a query-title pair to a longer one is less than a preset ratio threshold, filtering out the query-title pair.

4. The method according to claim 1, wherein training the first language model using the train corpuses comprises:

training the first language model using edited sentences in the monolingual training corpuses, wherein the first language model is configured to calculate a match score of an n-gram phrase, where n is a preset positive integer.

5. The method according to claim 1, wherein the sentence editing model further comprises a length model, the length model is configured to calculate length scores of sentences with different lengths.

6. The method according to claim 1, wherein the sentence editing model further comprises a second language model, the method further comprises:

training the second language model by taking news titles as training corpuses, wherein the second language model is configured to calculate a match score of an m-gram phrase, where m is a preset positive integer.

7. The method according to claim 1, wherein the sentence editing model further comprises a syntactic structure model, the method further comprises:

training the syntactic structure model by taking artificially edited sentences as training samples, wherein the syntactic structure model is configured to calculate a similarity score in syntactic structure between an artificially edited sentence and each edited sentence.

8. The method according to claim 1, wherein the sentence editing model is obtained by weighting and combining models comprised therein.

9. A sentence editing method being implemented on a computer including one or more processors and a memory storing one or more software units, including an input obtaining unit, a sentence editing model, a sentence output unit, and a training unit, the sentence editing method, comprising:

receiving from a user at the input obtaining unit a sentence to be edited;

providing the sentence to be edited to the sentence editing model to obtain a plurality of candidate edited sentences and an editing score of each candidate edited sentence;

selecting a candidate edited sentence having an editing score satisfying a preset requirement as an edited sentence; and displaying the edited sentence to the user by the sentence output unit, wherein the sentence editing model is established by:

obtaining from a web search engine, search logs including queries and titles of clicked search results corresponding to the queries to form query-title pairs, each of the queries corresponding to a sentence input into the web search engine;

forming monolingual training corpuses by taking a title in each of the query-title pairs as a sentence to be edited and taking a query in the query-title pair as an edited sentence; and training a translation model and a first language model using the monolingual training corpuses, to obtain the sentence editing model comprising the translation model and the first language model;

wherein the translation model translates a sentence in a first language to another sentence in the first language.

10. The method according to claim 9, wherein, the sentence to be edited is a description sentence for an entity word; and the edited sentence includes a reason why the entity word is recommended as a recommended entity word corresponding to a query in a search result page.

11. An apparatus for using a sentence editing model, comprising:

a processor; and a memory, configured to store one or more software units executable by the processor, wherein the one or more software units comprises:

an obtaining unit, configured to receive queries and titles of clicked search results from search logs of a web search engine to form query-title pairs; and to form monolingual training corpuses by taking a title in each of the query-title pairs as a sentence to be edited and taking a query in the query-title pair as an edited sentence; and a training unit, configured to train a translation model and a first language model using the monolingual training corpuses, to obtain the sentence editing model comprising the translation model and the first language model;

wherein the translation model is configured to perform a monolingual translation on a sentence input by a user;

wherein the training unit comprises a translation model training sub unit, configured to train the translation model using sentences to be edited and edited sentences corresponding to the sentences to be edited in the monolingual training corpuses, wherein the translation model is configured to calculate a translation score of an edited sentence corresponding to each sentence to be edited.

12. The apparatus according to claim 11, wherein the obtaining unit comprises:

a first obtaining sub unit, configured to obtain the queries from the search logs;

a classifying sub unit, configured to classify the queries using a pre-trained classifier, to obtain queries belonging to a preferred expression category; and a second obtaining sub unit, configured to obtain titles of clicked search results corresponding to queries belonging to the preferred expression category from the search logs, to form the query-title pairs;

wherein the obtaining unit further comprises:

a training sub unit, configured to obtain preferred expression sentences corresponding to entries from encyclopedia webpages, or to obtain the preferred expression sentences from webpages using a preferred expression sentence template; and to train the classifier using obtained preferred expression sentences as positive samples; and wherein the second obtaining sub unit is configured to:

obtain the titles of clicked search results corresponding to queries belonging to the preferred expression category from the search logs;

split each obtained title into one or more sub-titles; and form a query-title pair according to the query and a corresponding sub-title.

13. The apparatus according to claim 11, wherein the one or more software units further comprises:

a filter processing unit, configured to perform at least one of following filter processing on the monolingual training corpuses:

when there is no same word between a query and a title of a query-title pair, filtering out the query-title pair;

when a query and a title in a query-title pair are same, filtering out the query-title pair;

when a length of a query in a query-title pair does not satisfy a preset length requirement, filtering out the query-title pair; and when a ratio of a shorter one of a length of a query and a length of a title in a query-title pair to a longer one is less than a preset ratio threshold, filtering out the query-title pair.

14. The apparatus according to claim 11, wherein the training unit comprises:

a first language model training sub unit, configured to train the first language model using edited sentences in the monolingual training corpuses, wherein the first language model is configured to calculate a match score of an n-gram phrase, where n is a preset positive integer.

15. The apparatus according to claim 11, wherein the sentence editing model further comprises a length model, the length model is configured to calculate length scores of sentences with different lengths.

16. The apparatus according to claim 11, wherein the sentence editing model further comprises a second language model, the training unit comprises:

a second language model training sub unit, configured to train the second language model by taking news titles as training corpuses, wherein the second language model is configured to calculate a match score of an m-gram phrase, where m is a preset positive integer.

17. The apparatus according to claim 11, wherein the sentence editing model further comprises a syntactic structure model, the training unit comprises:

a syntactic structure model training sub unit, configured to train the syntactic structure model by taking artificially edited sentences as training samples, wherein the syntactic structure model is configured to calculate a similarity score in syntactic structure between an artificially edited sentence and each edited sentence.

18. The apparatus according to claim 11, wherein the training unit comprises:

a model combining sub unit, configured to weight and combine models comprised in the sentence editing model, to obtain the sentence editing model.

* * * * *